Sept. 2, 1947.  L. M. RICKETTS  2,426,791
FRICTION CLUTCH
Filed Oct. 25, 1945   2 Sheets—Sheet 2

Inventor
LAWRENCE M. RICKETTS

By Church & Church
His Attorneys

Patented Sept. 2, 1947

2,426,791

UNITED STATES PATENT OFFICE 2,426,791

FRICTION CLUTCH

Lawrence M. Ricketts, Baltimore, Md., assignor of one-fourth to S. Proctor Brady, Sr., New York, N. Y., one-fourth to S. Proctor Brady, Jr., Brooklandville, Md., and one-fourth to Merton W. Morgan, Baltimore, Md.

Application October 25, 1945, Serial No. 624,377

8 Claims. (Cl. 192—94)

This invention relates to improvements in friction clutches for driving and driven members or shafts and of the type wherein clutching disks are moved into and out of clutching engagement with each other by screw shafts each formed with reversely threaded portions operatively associated with said disks.

One object of the invention is to provide an actuating mechanism for said screw shafts which can be manufactured economically and which is highly practical and can be readily assembled.

Another object is to provide a highly efficient screw shaft actuating mechanism in the sense that clutching action of the disks will be highly effective or efficient by reason of the fact that the force applied to the actuating mechanism will be amplified by that mechanism so that a greater force is actually transmitted to the screw shafts.

A still further object of the invention is to provide a mounting for the screw shafts which will not require any adjustments of the shafts and their actuating mechanism after assembly and which will so support said shafts as to always maintain the latter in proper alinement.

Another object is to provide an actuating mechanism that is substantially enclosed and thus protected. Preferably the screw shafts are actuated by rack bars carried on a sleeve, said racks being engaged with gears on the shafts and movable axially of the shafts by said sleeve. The gears and racks are substantially housed and protected within said sleeve but as they are subjected to comparatively heavy wear they are readily accessible for replacement purposes, the gears being removable from their shafts and the racks being similarly demountably attached to the sleeve.

With these and other objects in view the invention consists in certain details of construction and combinations and arrangements of parts, all as will hereinafter be more fully described and the novel features thereof particularly pointed out in the appended claims.

In the accompanying drawings—

Figure 1:
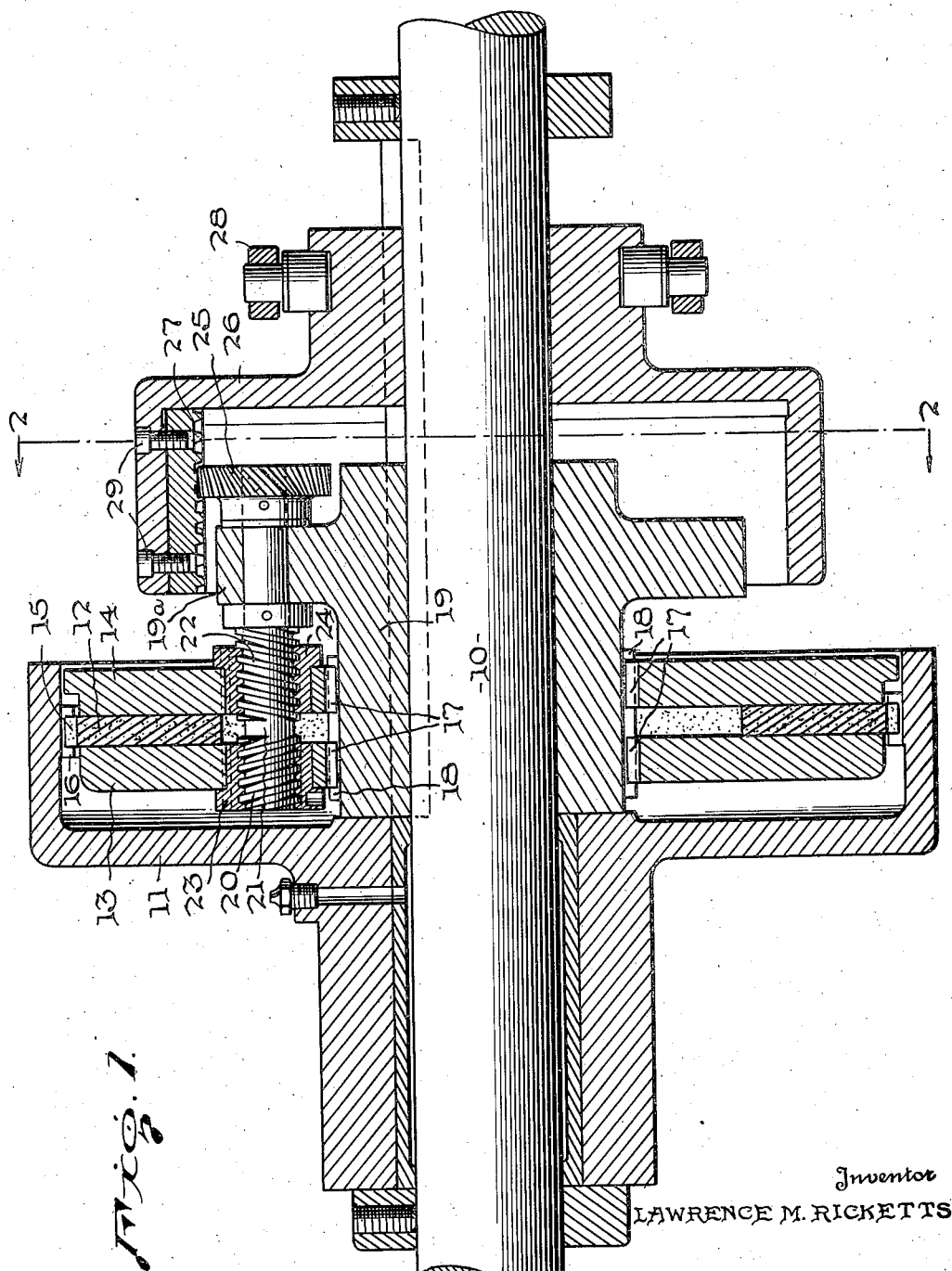
Figure 1 is a sectional view taken longitudinally of the driving and driven shafts.
Figure 2:
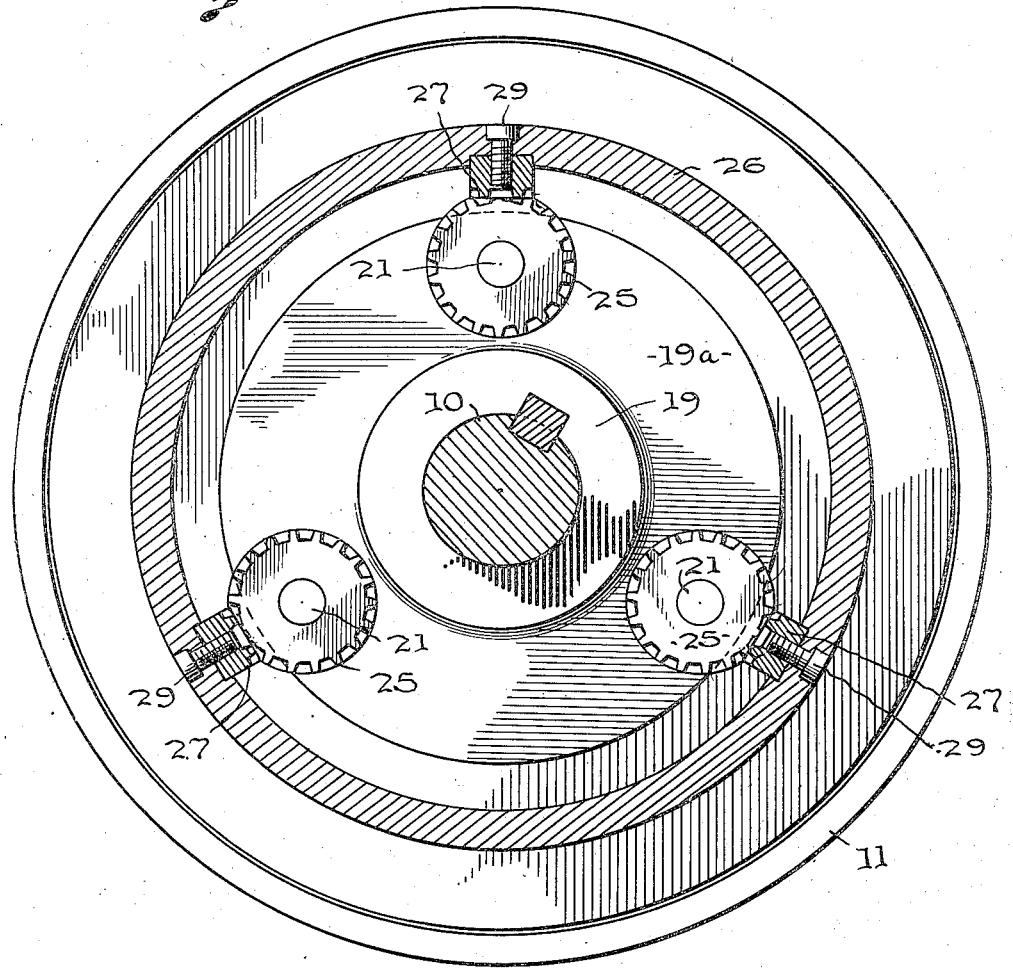
Fig. 2 is a sectional view taken in the plane indicated by line 2—2 of Fig. 1.
Figure 3:
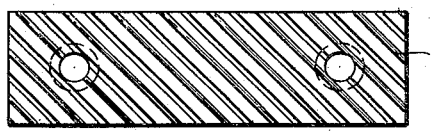
Fig. 3 is a plan view of one of the rack bars for rotating a screw shaft and its gear.

Referring particularly to Fig. 1, the driving shaft, indicated at 10, and the driven member, illustrated in the form of a sleeve, indicated at 11, are adapted to be clutched together by the disk 12 being clamped between disks 13, 14, disk 12 having exterior peripheral teeth 15 which engage teeth 16 on the interior of sleeve 11 and disks 13, 14 having interior peripheral teeth 17 which engage teeth 18 on a hub 19 keyed to shaft 10. This clutching action of the several disks is effected through a plurality of screw shafts 20 each formed with reversely threaded portions 21, 22 which engage similarly threaded nuts 23, 24 mounted in suitable openings in disks 13, 14 and held by keys against rotation relatively to the respective disks.

As previously indicated the present invention contemplates the provision of means for actuating these screw shafts which will possess the advantages of being economical to manufacture and assemble and which will not only operate with maximum efficiency but can also be easily maintained in a state of high operating efficiency. To these ends the screw shafts 20 are journaled in extended bearings in the hub 19 with the ends of the shafts projecting beyond said bearings and provided with gears 25 to which rotary motion is imparted by instrumentalities carried by a sleeve 26 which is slidable on shaft 10 axially of said gears for the purpose of actuating the latter. Preferably the hub 19 has an annular flange 19a in which the screw shaft bearings are formed and the gears 25 are of the helical type and engage rack bars 27 carried by the sleeve 26. The racks 27 are disposed longitudinally of the sleeve and, as will be apparent, movement of the sleeve along shaft 10 will effect a rotary movement of gears 25 and screw shafts 20 which, in turn, will cause the disks 13, 14 to move toward or away from disk 12 depending upon the direction in which sleeve 26 is moved on shaft 10. Sleeve 26 may be provided with a shifting lever 28 for sliding it on shaft 10.

What might be termed the hub end of sleeve 26 is closed and the screw shafts extend into the opposite open end of said sleeve so that the gears and racks are substantially enclosed and protected at all times. As will also be apparent the bearings for the screw shafts may be of considerable length so that they afford a firm support for said shafts and maintain the latter in proper alinement.

The gears 25 may, of course, be removed from their shafts for replacement when necessary and in order to permit renewal of worn rack bars, said bars are preferably in the form of demountable plates secured to the sleeve by threaded bolts 29. Preferably the rack bars are seated in grooves in the interior surface of sleeve 26 and extend to the open end of said sleeve. Thus, the bars are held against lateral movement by the side walls of the grooves but they can be quickly removed endwise from their grooves after removal of their fastening bolts. This removability of the racks is also advantageous in that they can be made from bars of rectangular cross-section and, as will be appreciated, the cutting of the rack teeth on the plain surface of such a bar is a comparatively simple manufacturing process.

Another factor of importance is that the present form of screw actuating mechanism increases the force applied to the screws. By having the screws journaled in the hub flange and sleeve 26 spaced radially from that flange, the diameter of gears 25 may be considerably greater than that of the screw shafts so that the force used in shifting sleeve 26 is materially increased through the racks and gears. Thus the clutching action of disks 12, 13 and 14 is effectuated with maximum efficiency.

The present construction also facilitates assembly of the mechanism. It is only necessary to assemble the clamping nuts 23, 24 and the several disks on the screw shafts, and then slip those shafts through their bearings in hub 19, after which the gears 25 are mounted on the ends of the screws.

What is claimed is:

1. In a friction clutch for driving and driven members comprising clutching disks associated with said members and screw shafts having reversely threaded portions operatively associated with said disks for moving the latter into and out of clutching relationship, means for actuating said screw shafts having, in combination, a helical gear on each shaft, a hollow sleeve encircling the gears on the several shafts, racks mounted in the interior of said sleeve engaging said gears, and means for moving said sleeve axially of the gears.

2. In a friction clutch for driving and driven members comprising clutching disks associated with said members and screw shafts having reversely threaded portions operatively associated with said disks for moving the latter into and out of clutching relationship, means for actuating said screw shafts having, in combination, a helical gear on each shaft, an annular sleeve slidable on one of said members, said helical gears being positioned in the interior of said sleeve, racks demountably attached to the sleeve engaging said helical gears, and means for sliding said sleeve axially of said gears.

3. In a friction clutch for driving and driven members comprising clutching disks associated with said members and screw shafts having reversely threaded portions operatively associated with said disks for moving the latter into and out of clutching relationship, means for actuating said screw shafts having, in combination, a sleeve slidably mounted on one of said members, one end of said sleeve being closed, said screw shafts extending into the opposite open end of said sleeve but terminating short of the closed end of the sleeve, helical gears mounted on the screw shafts within the sleeve, racks mounted on the interior surface of the sleeve in engagement with said helical gears and means for moving said sleeve and racks axially of the gears.

4. In a friction clutch for driving and driven members comprising clutching disks associated with said members threaded nuts secured in said disks and screw shafts having reversely threaded portions engaging the nuts in said disks for moving the latter into and out of clutching relationship, means for actuating said screw shafts having, in combination, an annular sleeve slidable on one of said members, one end of said sleeve being open with said screw shafts extending through said open end into the interior of the sleeve, helical gears mounted on said screw shafts within the sleeve, said gears being of relatively large diameter compared to the screw shafts, racks on the inner annular surface of the sleeve and engaging said helical gears, and means for sliding said sleeve axially of the helical gears.

5. In a friction clutch for driving and driven members comprising clutching disks associated with said members threaded nuts secured in said disks and screw shafts having reversely threaded portions engaging the nuts in said disks for moving the latter into and out of clutching relationship, means for actuating said screw shafts having, in combination, a hub fast on one of said members, a radial flange on said hub, bearings in said flange through which said screw shafts extend with the threaded portions of the shafts located at one side of the flange, helical gears mounted on said shafts at the opposite side of said flange, a sleeve slidable on one of said members, said sleeve being open at one end and encircling said flange and said helical gears being located within said sleeve, racks on the interior surface of the sleeve in engagement with said gears, and means for sliding said sleeve and racks axially of said gears.

6. In a friction clutch for driving and driven members comprising clutching disks associated with said members and screw shafts having reversely threaded portions operatively associated with said disks for moving the latter into and out of clutching relationship, means for actuating said screw shafts having, in combination, a sleeve slidable on one of said members, helical gears mounted on said screw shafts within said sleeve, flat faced inserts mounted on the interior of said sleeve having rack teeth thereon engaging said helical gears, and means for sliding said sleeve and inserts axially of said gears.

7. In a friction clutch for driving and driven members comprising clutching disks associated with said members and screw shafts having reversely threaded portions operatively associated with said disks for moving the latter into and out of clutching relationship, means for actuating said screw shafts having, in combination, a hub fast on one of said members, elongated bearings in said hub through which said screw shafts project, helical gears mounted on the projecting ends of said screw shafts, the peripheries of said gears being located beyond the periphery of the hub, a sleeve slidable on one of said members axially of the helical gears with said gears located in the interior of the sleeve, racks on the interior of the sleeve in engagement with said gears, and means for sliding said sleeve on said member.

8. In a friction clutch for driving and driven members comprising clutching disks and screw shafts each having a reversely threaded end portion operatively associated with said disks for moving said disks into and out of clutching engagement, means for actuating said screw shafts having, in combination, a hub fast on one of said members, screw shaft bearings in said hub in which said shafts are journaled with the opposite ends of said shafts projecting beyond the bearings, gears mounted on said opposite ends of said shafts, said gears being of a diameter greater than that of the threaded portions of the shafts, a sleeve slidable on one of said members axially of said screw shafts, means carried by said sleeve for rotating said gears upon sliding movement of said sleeve, and means for sliding said sleeve axially of said screw shafts.

LAWRENCE M. RICKETTS.

REFERENCES CITED

The following references are of record in the file of this patent:

UNITED STATES PATENTS

| Number | Name | Date |
|---|---|---|
| 1,217,569 | Cooper | Feb. 27, 1917 |
| 1,494,166 | Hamilton | May 13, 1924 |

FOREIGN PATENTS

| Number | Country | Date |
|---|---|---|
| 13,684 | Great Britain | June 27, 1908 |
| 6,448 | Great Britain | Mar. 17, 1902 |
| 245,857 | Germany | Apr. 18, 1912 |